US007866545B2

(12) United States Patent
Rapf et al.

(10) Patent No.: US 7,866,545 B2
(45) Date of Patent: Jan. 11, 2011

(54) METHOD FOR IDENTIFYING BANKNOTES ORIGIN

(75) Inventors: Wolfgang Rapf, München (DE); Steffen Schmalz, München (DE); Helmut Steidl, München (DE); Dieter Stein, Holzkirchen (DE); Shanchuan Su, Neubiberg (DE)

(73) Assignee: Giesecke & Devrient GmbH, Munich (DE)

(*) Notice: Subject to any disclaimer, the term of this patent is extended or adjusted under 35 U.S.C. 154(b) by 744 days.

(21) Appl. No.: 11/631,854

(22) PCT Filed: Jul. 4, 2005

(86) PCT No.: PCT/EP2005/007201

§ 371 (c)(1),
(2), (4) Date: Oct. 1, 2007

(87) PCT Pub. No.: WO2006/005475

PCT Pub. Date: Jan. 19, 2006

(65) Prior Publication Data

US 2008/0283589 A1 Nov. 20, 2008

(30) Foreign Application Priority Data

Jul. 8, 2004 (DE) ....................... 10 2004 033 092

(51) Int. Cl.
*G06K 5/00* (2006.01)

(52) U.S. Cl. ....................................... 235/379; 235/380

(58) Field of Classification Search ................. 235/379, 235/380; 705/14.2, 14.26, 16, 21, 68
See application file for complete search history.

(56) References Cited

U.S. PATENT DOCUMENTS 6,550,671 B1 4/2003 Brown et al.

(Continued)

FOREIGN PATENT DOCUMENTS

DE 199 46 536 3/2001

(Continued)

OTHER PUBLICATIONS

Search Report of German Patent Office regarding Patent Application No. 10 2004 033 092.1 (Nov. 11, 2004) 2 pgs.

*Primary Examiner*—Thien M Le
(74) *Attorney, Agent, or Firm*—Bacon & Thomas, PLLC

(57) ABSTRACT

The invention relates to a method for verifying the origin of bank notes from an automatic teller.

In the inventive method for verifying the origin of bank notes, in particular forgeries, from an automatic teller, data characterizing bank notes to be paid out or already paid out from a sensor device for checking the bank notes to be paid out or already paid out for authenticity and/or type and/or state are detected, the data of the bank notes to be paid out or already paid out are stored, check data are generated by means of the sensor device for each bank note whose origin is to be verified, whereby the check data of the bank note to be verified are compared with the stored data of the paid out bank notes and the paid out bank note is ascertained whose stored data have the greatest match to the check data of the bank note to be verified, and the verification of origin for the bank note to be verified from the automatic teller is regarded as furnished if the match exceeds a given threshold value.

20 Claims, 2 Drawing Sheets

U.S. PATENT DOCUMENTS

| | | | | |
|---|---|---|---|---|
| 6,678,401 | B2 * | 1/2004 | Jones et al. | 705/39 |
| 2004/0028266 | A1 | 2/2004 | Jones et al. | |

FOREIGN PATENT DOCUMENTS

| | | | |
|---|---|---|---|
| DE | 101 07 344 | | 10/2001 |
| DE | 102 01 987 | | 7/2003 |
| DE | 102 42 572 | | 4/2004 |
| DE | 20 2004 007 664 | | 10/2004 |
| JP | 2004102562 | A | 4/2004 |

* cited by examiner

METHOD FOR IDENTIFYING BANKNOTES ORIGIN

FIELD OF THE INVENTION

This invention relates to a method for verifying the origin of bank notes from an automatic teller.

BACKGROUND

It has become increasingly common to pay out bank notes using automatic tellers in which the payout of bank notes can be initiated for example by means of a magnetic strip card or chip card and the input of a personal identification number. The paid out amount is charged to an account associated with the magnetic strip card or chip card. Such automatic tellers offer the advantage that the payout of bank notes is possible round-the-clock since no counter staff whatsoever are required.

The complete absence of counter staff in the payout of bank notes by means of automatic tellers generally makes it impossible to verify that said bank notes were output by a certain automatic teller. This is problematic for example when the paid out bank notes are forgeries.

SUMMARY

It is the problem of the present invention to specify a method for verifying the origin of bank notes from an automatic teller.

In the inventive method for verifying the origin of bank notes, in particular forgeries, from an automatic teller, data characterizing bank notes to be paid out or already paid out from a sensor device for checking the bank notes to be paid out or already paid out for authenticity and/or type and/or state are detected, the data of the bank notes to be paid out or already paid out are stored, check data are generated by means of the sensor device for each bank note whose origin is to be verified, whereby the check data of the bank note to be verified are compared with the stored data of the paid out bank notes and the paid out bank note is ascertained whose stored data have the greatest match to the check data of the bank note to be verified, and the verification of origin for the bank note to be verified from the automatic teller is regarded as furnished if the match exceeds a given threshold value.

The inventive method has in particular the advantage that reliable verification can be furnished for bank notes that they were output by a certain automatic teller. This is advantageous in particular if said bank note is a forgery, since this can prevent fraud and the circulation of counterfeit money.

Further advantages of the present invention will result from the dependent claims as well as the following description of embodiments with reference to figures.

BRIEF DESCRIPTION OF THE DRAWINGS

The figures are described as follows:

FIG. 1 shows a schematic representation of a schematic structure of an automatic teller 10 for paying out bank notes.

DETAILED DESCRIPTION OF THE PREFERRED EMBODIMENTS

Figure 1:
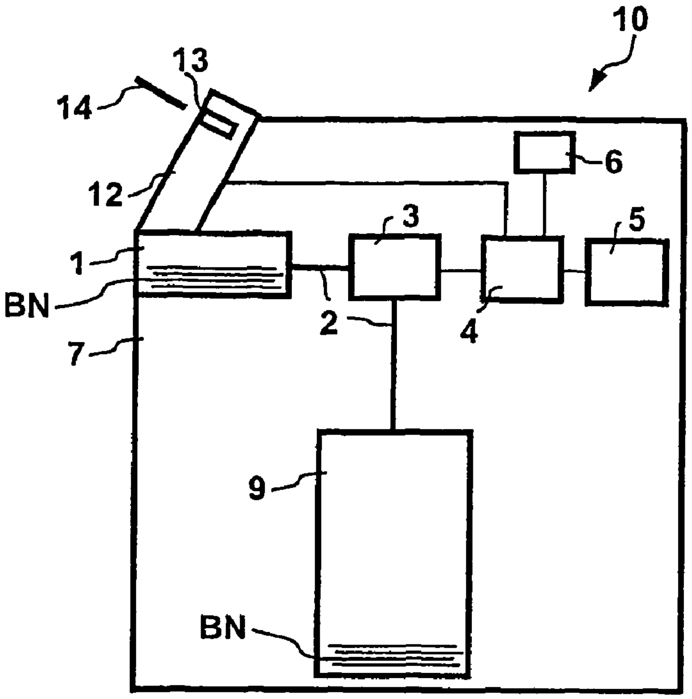
FIG. 1 an automatic teller for paying out bank notes.

The automatic teller 10 has an output pocket 1 into which bank notes BN to be paid out are output to a recipient. The bank notes BN are removed from a container 9 by a transport system 2 and can be supplied to a sensor device 3. The sensor device 3 detects features of each single bank note that are relevant for example for judging the authenticity and/or the type (currency, denomination) and/or the state, etc., of the bank note. Such features can be detected for example by different sensors mechanically, acoustically, optically, electrically and/or magnetically. Known authentication features comprise for example printing inks with special optical and/or magnetic properties, metallic or magnetic security threads, the use of brightener-free bank note paper, information contained in an electrical circuit, etc. The type of bank note is specified e.g. by its size, printed pattern, colors, etc., whereas the state of the bank note can be derived for example from the optical appearance (soiling). The features are detected by the sensor device 3, and corresponding data of the sensor device 3 transferred to a control device 4.

By the control device 4 the data of the detected features are stored in the control device 4 or a nonvolatile memory 5 associated with the control device 4. The nonvolatile memory 5 can be formed e.g. by an EEPROM or a flash memory, a hard disk, etc.

For control of the automatic teller 10 by the recipient of the bank notes BN to be paid out, an input/output device 12 is connected to the control device 4 to permit for example the selection of certain processing modes, or inform the recipient about the processing of the payout. The input/output device 12 furthermore has an identification device 13, for example a reader for a magnetic strip card or chip card 14. By inputting an individual card 14 and possibly a personal identification number, the recipient of bank notes BN can identify himself with the automatic teller 10 and have the amount corresponding to the bank notes BN to be paid out charged to his account.

The data of each paid out bank note BN are linked with information about the recipient's identity, e.g. by the data having the recipient's account number added thereto. Further information about the payout operation can also be added, e.g. date, time, identification number of the automatic teller 10, identification number of the container 9, etc. Moreover, additional information about the paid out bank notes BN can be added if it could be generated during processing, e.g. denomination and/or orientation of the particular bank note BN and/or the serial number of the particular bank note BN. The information linked with the data of the paid out bank notes BN is stored in the nonvolatile memory 5 together with the data of the paid out bank notes BN.

The data of the paid out bank notes BN stored in the nonvolatile memory 5 and the information linked therewith can be read via an interface 6 which is connected to the control device 4 or the nonvolatile memory 5, to permit verification of the origin of the paid out bank notes BN from the automatic teller 10. The interface 6 can be designed e.g. as a modem, network connection, Internet connection, as a parallel, serial or USB interface, or also as a reading device for an optical or magnetic memory, etc. It is thus possible to record the data and information of the paid out bank notes BN e.g. on a storage medium, a portable computer, etc., which a service person carries. However, it is also possible for the data to be transferred via the modem, network connection, Internet connection, etc., to a certain place where the verification is to be furnished.

Figure 3:
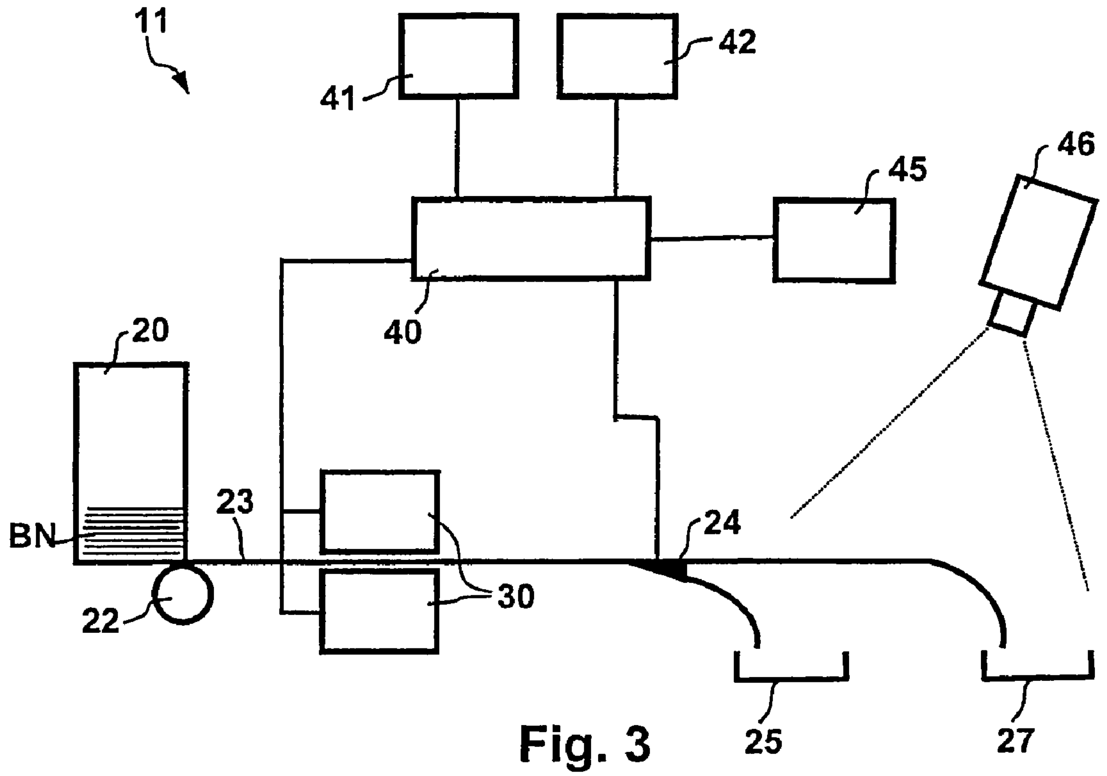

Alternatively, the data of the bank notes BN to be paid out can be generated using a bank note processing machine 11 shown in FIG. 3. In this case, the sensor device 3 of the automatic teller 10 can be omitted, since the data of the bank notes BN to be paid out are generated and stored by the bank note processing machine 11.

The bank note processing machine 11 has an input pocket 20 for input of the bank notes BN intended for payouts, which is engaged by a singler 22. The singler 22 grasps one of the bank notes BN to be processed at a time and transfers the single bank note to a transport system 23 which transports the single bank note through a sensor device 30. The sensor device 30 has a structure that can correspond to the structure of the sensor device 3 of the automatic teller 10; in particular it can have sensors of the same type which detect the features of the bank notes BN, as described above for the automatic teller 10, and generate corresponding data for them which correspond to the data of the sensor device 3 of the automatic teller 10. The data of the bank notes BN are passed on to a control device 40 by which the data of the detected features are compared with comparative data which permit the recognition of authentic or forged and/or suspect bank notes, the type of bank notes, the state of the bank notes, etc. The comparative data and programs required for operating the bank note processing machine 11 are present in the form of software and stored in the control device 40 or a nonvolatile memory 41 associated with the control device 40. The nonvolatile memory 41 can be formed e.g. by an EEPROM, a flash memory, a hard disk, etc.

On the basis of the comparison carried out by the control device 40 between the data of the particular bank note and the comparative data, a gate 24 disposed in the transport system 23 is driven to deposit the bank note for example in output pockets 25 or 27. It can be provided that the output pocket 23 receives the bank notes BN that are suitable for output with an automatic teller 10. These are in particular bank notes that are authentic. Further, the state of the bank notes can also be judged, so that only bank notes in good condition are provided for payout with an automatic teller 10 and are deposited in the output pocket 25. All other bank notes, in particular forgeries and suspect bank notes as well as bank notes in poor condition, are deposited in the output pocket 27.

For control of the bank note processing machine 10 by a service person, an input/output device 45 is connected to the control device 40 to permit for example the selection of certain processing modes or inform the service person about the processing of the bank notes 21.

To permit the desired verification of origin from a certain automatic teller 10 to be furnished at a later time, the data generated by the sensor device 30 for the bank notes suitable for a later payout with an automatic teller 10, i.e. the bank notes deposited in the output pocket 25, are stored in the nonvolatile memory 41 of the bank note processing machine 11.

The bank notes deposited in the output pocket 25 are then filled into a container 9 as used for the automatic tellers 10. Since the containers 9 as a rule have a unique identification, said identification of the container 9 used is linked as information with the data of the bank notes BN filled into said container 9, and likewise stored in the nonvolatile memory 41. The identification of the container 9 can be read in if the identification is present e.g. as a bar code or transponder, but it can also be entered by means of the input/output device 45. As further information, the date and/or time of filling of the container 9 and/or the date and/or time of insertion of the container 9 into an automatic teller 10 and/or the identification of the automatic teller 10 can be linked with the data and stored. The identification of the automatic teller 10 can also be stored as an alternative to the identification of the container 9. Furthermore, information on the origin of the bank notes BN can also be stored. If the bank notes BN are for example from one or more deposits that are input into the input pocket 20 of the bank note processing machine 11 for the above-described processing, information about said deposits, e.g. an account number or the name of the depositor, can be assigned to the particular bank notes BN and stored, so that their origin can later be traced beyond the automatic teller 10.

For securing and monitoring the operation of filling the container 9 with the bank notes BN prepared for payouts, it can be provided that the bank note processing machine 11, in particular the output pockets 25, 27, are monitored. For monitoring it is possible to use e.g. a camera 46 whose images are stored e.g. together with the data of the bank notes BN and the information linked therewith in the nonvolatile memory 41.

Figure 4:
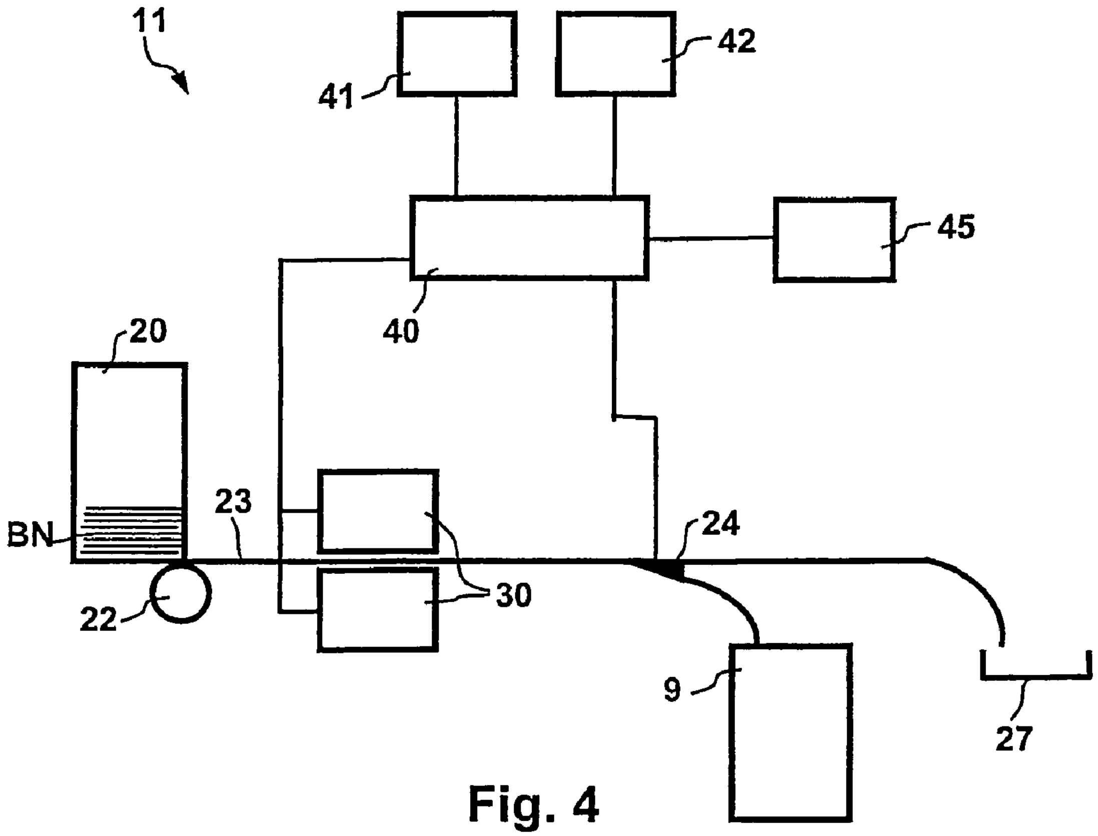

Alternatively or additionally, the filling of the container 9 can be secured as shown in FIG. 4. The container 9 is connected here directly to the bank note processing machine 11 so that the filling of the container 9 is effected automatically without the intermediary of service persons.

The data of the bank notes BN provided for payouts stored in the nonvolatile memory 41 as well as the information linked therewith and any images can be read out via an interface 42, which is connected to the control device 40 or the nonvolatile memory 41, to later permit a verification of the origin of the paid out bank notes from the automatic teller 10 into which the container 9 filled with the bank notes BN prepared for payouts is inserted. The interface 42 can be designed e.g. as a modem, network connection, Internet connection, as a parallel, serial or USB interface, or also as a reading device for an optical or magnetic memory, etc. It is thus possible to record the data and information of the paid out bank notes BN e.g. on a storage medium, a portable computer, etc., which a service person carries. However, it is also possible that the data are transferred via the modem, network connection, Internet connection, etc., to the central place where the verification is to be furnished. It is additionally possible to acquire and store, upon payout, information that is assigned to the automatic teller 10 and/or the container 9 and/or the bank notes, e.g. the information described above in connection with the automatic teller 10.

Figure 2:
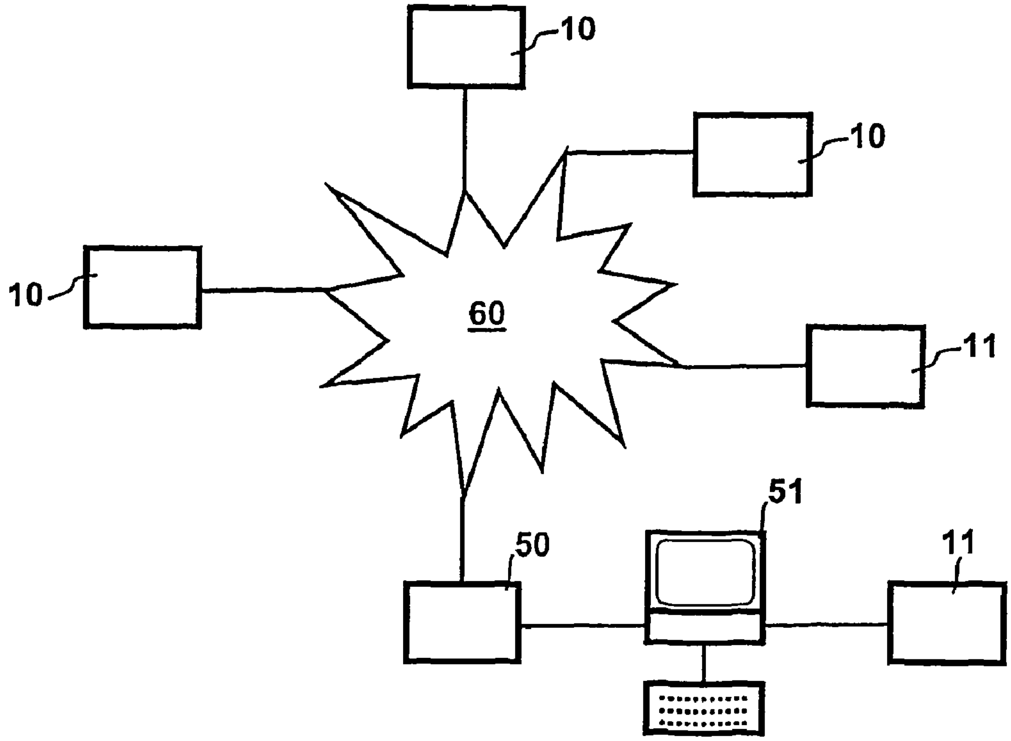
FIG. 2 a system for verifying the origin of bank notes from an automatic teller, FIG. 3 a first embodiment of a bank note processing machine for verifying the origin of bank notes from an automatic teller, and FIG. 4 a second embodiment of a bank note processing machine for verifying the origin of bank notes from an automatic teller.

FIG. 2 shows a schematic representation of a basic structure of a system for verifying the origin of bank notes from an automatic teller.

The system can consist of one or more automatic tellers 10 which are connected by means of their interfaces 6 via a network 60, e.g. a telephone network, a local network, the Internet, etc., to a verification device, consisting e.g. of a computer 51 with an interface 50, located at a certain place. One or more bank note processing machines 11 can be attached to the computer 51 via the network 60 and/or directly.

If a recipient claims to have obtained a bank note BN, in particular a forgery, from one of the automatic tellers 10, check data are generated for said bank note BN. For this purpose one of the automatic tellers 10 can be used, in particular the automatic teller 10 from which the forgery is supposed to come according to the recipient. For the forgery, data are then generated in the above-described way by the sensor device 3 of the automatic teller, to be used as check data. Alternatively, the check data are generated by the sensor device 30 of the bank note processing machine 11 which has a structure corresponding to the structure of the sensor device that was used for generating the stored data of the output bank notes BN. For consideration of deviations produced by fluctuations during processing, the forgeries can be processed several times. The check data are generated from the thereby generated data e.g. by averaging.

The generated check data are compared with the data of the paid out bank notes stored in the nonvolatile memories 5, 41. This comparison can be carried out by the control device 4, 40. The comparison can also be carried out by the computer 51 if the stored data of the paid out bank notes and the check data were already transmitted to the computer via the network 60. Otherwise the computer can retrieve the data and check data required for the comparison from the particular automatic teller 10 and/or the particular bank note processing machine 11, or the data are transmitted by means of the above-described storage medium.

For the comparison, the check data of the forgery are compared for example by means of statistical methods with the stored data of the paid out bank notes BN of the automatic teller 10 from which they are supposed to have been paid out. Those data of the paid out bank note BN with the greatest match serve to verify that the forgery was paid out from the automatic teller 10 if the match exceeds a certain measure, e.g. overshoots a given threshold value. If the data of the paid out bank note BN are linked, as described above, with the identity of the recipient to whom the bank note BN was paid out, e.g. via his account number, it can additionally be checked whether the bank note BN, i.e. the forgery, was actually paid out to said recipient. If no sufficient match is determined, the forgery cannot be from the automatic teller 10, as claimed. If a plurality of paid out bank notes BN are determined whose stored data have an equally good match to the check data, no clear statement can be made. In such a case it can only be said that a determination of origin is not possible for this forgery.

Since it is not always known in what orientation the data of the paid out bank notes BN were detected, sets of check data are generated for all possible orientations for the forgeries to be checked. This can be done by processing the forgeries in all four orientations (front, transport from the left; front, transport from the right; back, transport from the left; back, transport from the right) by means of the automatic teller or the bank note processing machine 11 to generate four sets of check data for the forgery. It is thus ensured that the comparison of the stored data of the paid out bank notes BN with the check data yields a result independently of the original orientation of the paid out bank notes BN.

To reduce the effort in generating the check data, it can also be provided to generate only two sets of check data. One set of check data is obtained e.g. by detecting the front of the forgery, the other by turning over the forgery and detecting the back. The two missing sets of check data can in this case be generated by the control device 4, 40 by the data of the two generated sets of check data being each evaluated backwards, since this corresponds to sets of check data of the two missing orientations.

Besides the described embodiment, a multiplicity of variations is possible.

For example, a bank note processing machine 11 is unnecessary for generating check data if the automatic teller 10 itself is used for generating the check data as described above. For this purpose a special operating mode can be provided which permits the service person, authenticating himself e.g. with a special card 14, to generate the check data.

A further possibility is to omit the computer 51. In this case the control device 4, 40 is used for verifying the origin from a certain automatic teller.

To reduce the effort in checking the data of the paid out bank notes BN, it can be provided, as described above, to consider only the data of the paid out bank notes BN of the automatic teller 10 from which the forgery is supposed to have been paid out. Besides this, further methods can be used, also additionally, to reduce the effort of the check.

It can thus be provided to consider only the data of the paid out bank notes BN that were located in a certain container 9. The particular container 9 can be selected e.g. by the date of filling of the container 9 and/or the date of insertion into the automatic teller 10. If the date and/or time of the alleged payout are also known, their consideration makes it possible to obtain a further reduction of the stored data to be checked for the paid out bank notes.

A reduction of effort can also be obtained if the data of the paid out bank notes BN are linked with the identity of the person to whom the forgery is supposed to have been paid out. In this case it is only necessary to check those data of the paid out bank notes BN assignable to the corresponding person.

The effort of checking the origin of a forgery can be reduced further if the additional data of the paid out bank notes BN, such as denomination and/or orientation, are used in the check. In this case it is only necessary to compare those data of the paid out bank notes BN with the check data in which denomination and/or orientation match.

If information about the orientation of the paid out bank notes BN is used, it is sufficient when detecting the forgery for generating the check data to detect the latter only in the known original orientation of the paid out bank note BN. This is also always given when the bank notes BN to be paid out are inserted into the containers 9 or the automatic tellers 10 in a certain, given orientation.

A further possibility for reducing the effort in checking the origin of a forgery can be obtained if the serial numbers of the paid out bank notes BN are determined and stored. In this case it is only necessary to look specifically for data with this serial number to carry out the check.

A further reduction of the effort for verifying origin is also obtained in the case that the check data of the sensor device 3, 30 from the forgery are recognized by the control device 4, 40 as data of a forgery. In this case the forgery would already have been recognized as a forgery upon payout by the automatic teller 10 or upon filling of the container 9 with the help of the bank note processing machine 11. For this reason a check with the stored data of the paid out bank notes can be omitted for such a forgery which is already recognized as a forgery upon generation of the check data. This results from the fact that same-type sensors and evaluation software are used in the control devices and recognized forgeries are not paid out or filled into a container 9, so that the existing forgery recognized upon generation of the check data cannot have been output by the automatic teller 10.

Conversely, it is also possible to reduce the effort for verifying origin by examining the stored data of the paid out bank notes BN for the existence of a forgery for which a verification is to be furnished. For this purpose, forgery data are generated for the existing forgery, e.g. from the check data, and the greatest deviations from the comparative data of the corresponding authentic bank note are determined. Such forgery data are normally generated to be able to recognize new forgeries that have appeared. If the forgery data are compared with the stored data of the paid out bank notes and no stored data of paid out bank notes are determined that contain the characteristic deviations of the forgery data, it can be assumed with very high certainty that the forgery is not from the automatic teller 10. If stored data from one or more output bank notes are found that have the deviations or similar deviations, the forgery can be from the automatic teller 10. For the final check, the stored data having the characteristic deviations are compared with the check data, as described above, to verify the origin from the automatic teller 10.

The suitability of the data characterizing the bank notes BN to be paid out or already paid out and described above in connection with the sensor device 3, 30 depends greatly on whether they are obtained from features of the bank notes BN that are particularly characteristic of single bank notes BN.

It is particularly suitable in this connection to use firstly the above-mentioned serial number. In addition to the actual serial number, which can be obtained e.g. by means of an evaluation program (OCR program) from the data of the sensor device, the image of the serial number resulting from the data of the sensor device is also particularly characteristic, since the serial number is applied to the bank note as a rule in a separate printing operation. There can thus be e.g. fluctuations of the position of the serial numbers, of the printing density of the serial numbers, etc., on single bank notes.

It is likewise suitable to use e.g. the position of a security thread of bank notes, since the security thread is incorporated into the bank notes not at a certain position but within a certain area. The exact position of the security thread is thus particularly characteristic of a certain bank note. If the security thread furthermore has a magnetic coding, this can be considered additionally or instead of the position of the security thread. The magnetic coding has continuous patterns characteristic of certain currencies and denominations. This continuous pattern does not always have the same starting point within the security thread, so that the magnetic coding can be used for characterizing a certain bank note if e.g. the starting point of the continuous pattern in the security thread is determined.

Unlike the view in FIG. 1, the automatic teller 10 can have more than one container 9. The individual containers then each contain e.g. only bank notes of a certain denomination of a currency.

As a further deviation it can be provided that the automatic teller 10 shown in FIG. 1 also permits the deposit of bank notes besides the payout of bank notes.

The invention claimed is:

1. A method for verifying the origin of bank notes, from an automatic teller, comprising:

detecting data characterizing bank notes to be paid out or already paid out using a sensor device for checking the bank notes to be paid out or already paid out for authenticity and/or type and/or state;

storing the data of the bank notes to be paid out or already paid out;

generating check data for each bank note whose origin is to be verified, by means of the sensor device;

comparing the check data of the bank note to be verified with the stored data of the paid out bank notes and ascertaining which data of a paid out bank note has the greatest match with the check data of the bank note to be verified; and verifying the bank note to be previously paid out from the automatic teller if the match between the data of the paid out bank note and the check data of the received bank note exceeds a given measure.

2. The method according to claim 1, wherein the data of the paid out bank notes are detected and stored by the automatic teller during payout.

3. The method according to claim 1, wherein the data of the paid out bank notes are detected and stored by a bank note processing machine before the filling of the automatic teller with the bank notes to be paid out.

4. The method according to claim 1, wherein the check data of the bank note to be verified are generated by the automatic teller.

5. The method according to claim 1, wherein the check data of the bank note to be verified are generated by a bank note processing machine.

6. The method according to claim 1, wherein the data of the bank notes are at least one of: transferred to a place and stored, and generated at the place and stored.

7. The method according to claim 6, wherein the comparison of the check data of the bank note to be verified with the stored data of the bank notes is carried out at the place.

8. The method according to claim 1, wherein the bank note to be verified is processed in all four orientations for generating check data.

9. The method according to claim 1, wherein the bank note to be verified is processed in two orientations for generating check data, and check data are obtained for two further orientations from the check data of the two processed orientations.

10. The method according to claim 1, including detecting information characterizing the payout of bank notes, and storing the information.

11. The method according to claim 10, wherein the information characterizing the payout of bank notes comprises an identification of at least one of: the automatic teller, a cassette, and a recipient of the paid out bank notes.

12. The method according to claim 10, wherein the information characterizing the payout of bank notes comprises a time of filling of a cassette with at least one of: bank notes to be paid out, filling of the automatic teller with bank notes to be paid out, equipping of the automatic teller with the cassette, and the payout of bank notes to a recipient.

13. The method according to claim 10, wherein the information characterizing the payout of bank notes comprises a statement about the particular bank note to be paid out or already paid out.

14. The method according to claim 10, wherein the information characterizing the payout of bank notes is considered upon generation of the check data, in particular the orientation of the particular bank note.

15. The method according to claim 10, wherein the information characterizing the payout of bank notes is considered upon comparison of the check data with the stored data of the bank notes.

16. The method according to claim 1, wherein the data characterizing the bank notes are checked as to whether the bank note to be paid out is a forgery, and the payout of a bank note to be paid out recognized as a forgery is prevented.

17. The method according to claim 16, wherein the origin of a forgery from the automatic teller is excluded if it is ascertained upon generation of the check data that a forgery is present.

18. The method according to claim 1, wherein for a forged bank note whose origin is to be verified, forgery data are generated which have deviations from comparative data of the corresponding authentic bank note, whereby the forgery data are compared with the stored data of the paid out bank notes to determine the deviation-containing data of the paid out bank notes, and the verification of the origin of the forged bank note from the automatic teller is furnished by comparing the determined stored data with the check data.

19. The method according to claim 1, wherein for generating the data characterizing the bank notes, one or more serial numbers of the particular bank note are evaluated.

20. The method according to claim 1, wherein for generating the data characterizing the bank notes, a security thread of the particular bank note is evaluated.

* * * * *